(12) United States Patent
Heyen et al.

(10) Patent No.: US 7,684,170 B2
(45) Date of Patent: Mar. 23, 2010

(54) MULTI-LAYER CAPACITOR AND INTEGRATED CIRCUIT MODULE

(75) Inventors: Johann Heyen, Munich (DE); Arne Jacob, Braunschweig (DE)

(73) Assignee: Technische Universitat Braunschweig Carolo-Wilhelmina, Braunschweig (DE)

( * ) Notice: Subject to any disclaimer, the term of this patent is extended or adjusted under 35 U.S.C. 154(b) by 368 days.

(21) Appl. No.: 11/570,860

(22) PCT Filed: Jun. 25, 2004

(86) PCT No.: PCT/DE2004/001345

§ 371 (c)(1), (2), (4) Date: Jul. 18, 2007

(87) PCT Pub. No.: WO2006/000168

PCT Pub. Date: Jan. 5, 2006

(65) Prior Publication Data

US 2008/0019074 A1    Jan. 24, 2008

(51) Int. Cl.
H01G 4/228 (2006.01)
H01G 4/236 (2006.01)

(52) U.S. Cl. ............. 361/306.3; 361/307; 361/303

(58) Field of Classification Search ............ 361/303, 361/307, 306.3
See application file for complete search history.

(56) References Cited

U.S. PATENT DOCUMENTS 5,583,359 A    12/1996    Ng et al. .................. 257/306

2001/0008479 A1    7/2001    Branchevsky ............ 361/306.3
2003/0081370 A1*   5/2003    Haskell et al. ........... 361/306.1

FOREIGN PATENT DOCUMENTS

| DE | 198 47 946 A1 | 4/2000 |
|----|---------------|--------|
| DE | 100 19 229 A1 | 11/2000 |
| EP | 0 776 016 A2  | 5/1997 |
| EP | 1 308 971 A2  | 7/2003 |
| JP | 11251180 A    | 9/1999 |
| JP | 2001196263 A  | 7/2001 |
| JP | 2002025856 A  | 1/2002 |
| JP | 2002198655 A  | 7/2002 |
| JP | 2003204164 A  | 7/2003 |

\* cited by examiner

*Primary Examiner*—Eric Thomas
(74) *Attorney, Agent, or Firm*—Whitham Curtis Christofferson & Cook, PC

(57) ABSTRACT

A multi-layer capacitor includes several electrically insulating layers that are stacked on top of one another. Parallel electrode plates are arranged between the insulating layers alternately one on top of the other, with each of the plates being separated by an intervening insulating layer. At least one first connecting line which extends perpendicularly through the layers is connected to one set of electrode plates and is insulated in relation to the other set of second electrode plates. Similarly, second connecting lines extend perpendicularly through the layers and are connected to the other set of plates and are insulated in relation to the one set of plates. The first connecting line extends centrally through the stacked electrode plates and is designed to carry a high-frequency signal.

9 Claims, 4 Drawing Sheets

MULTI-LAYER CAPACITOR AND INTEGRATED CIRCUIT MODULE

The invention relates to a multi-layer capacitor comprising a number of electrically insulating layers stacked on top of one another, first and second electrode plates arranged in parallel with one another between the insulating layers, wherein the first and second electrode plates are arranged spaced apart from one another above one another with in each case one intermediate insulating layer, and with at least one first connecting line extending perpendicularly through the layers which is connected to the first electrode plates and is insulated from the second electrode plates, and with second connecting lines extending perpendicularly through the layers which are connected to the second electrode plates and are insulated from the first electrode plates.

The invention also relates to an integrated circuit module with a carrier substrate and at least one integrated circuit on the carrier substrate.

BACKGROUND

Multi-layer capacitors are used, for example, for preventing or attenuating, respectively, in the case where a direct voltage is supplied to an active circuit component, particularly an integrated circuit, an unwanted leakage of other radio-frequency signals via the direct voltage supply line which would impair the radio-frequency characteristics of the integrated circuit. For this purpose, radio-frequency blocking capacitances are used. To prevent unwanted resonances from the blocking capacitance and line inductances, the connecting paths between these blocking capacitances and the integrated circuit must be short. To achieve short paths, the blocking capacitances are placed as surface-mountable devices (SMD) or bondable components directly next to a semiconductor chip on the surface of a carrier substrate. The additional space requirement and the increased number of bonds needed for the blocking capacitances is disadvantageous.

The arrangement described is disclosed, for example, in JP 02185052 A.

From the printed documents JP 2001196263 A, JP 2003204164 A, DE 198 47 946 A1, JP 2002198655 A and US 2001/0008479 A1, it is known to integrate the radio-frequency blocking capacitances into a multi-layer carrier substrate for the integrated circuit. This releases space on the surface of the carrier substrate for other active components and reduces the number of wire bonds or also flip-chip connections needed on the substrate surface.

A suitable carrier substrate is, for example, the low temperature co-fired ceramics (LTCC) described in US 2001/0008479 A1 since they have numerous thin electrical layers. In principle, parallel plate arrangements for multi-layer capacitors suitable for integration in carrier substrates are adequately well known and described, for example, in DE 100 19 229 A1, U.S. Pat. No. 5,583,359, JP 2002025856 A and JP 11251180 A. The vertical feed lines and connecting lines leading through the electrode plates disadvantageously lead to parasitic inductances in this multi-layer capacitor. In addition, the overall dimensions of the arrangements correspond to not negligible proportions of the wavelength at high frequencies. This leads to unwanted resonances which greatly restrict the operating frequency range towards the top.

Thus, commercially available multi-layer capacitors by means of which capacitance values of 10 to 100 pF can be achieved already have self-resonant frequencies from about 5 GHz.

SUMMARY

It is the object of the invention, therefore, to create an improved multi-layer capacitor and an integrated circuit module with a carrier substrate into which such a multi-layer capacitor is integrated, wherein the self-resonances are shifted towards higher frequencies outside the operating frequency range, the capacitance values remaining unchanged.

According to the invention, the object is achieved with the generic multi-layer capacitor in that a first connecting line provided for application of a radio-frequency signal extends centrally through the stacked first and second electrode plates.

Due to the signal-conducting vertical connecting line arranged preferably centrally in the parallel electrode plates, the average current paths are considerably shortened and thus line inductances are reduced. Due to the interleaved arrangement of the electrode plates and connection of the first and second electrode plates in each case with first and second vertical connecting lines within a compact multi-layer arrangement, the self-resonances are shifted towards higher frequencies outside the operating frequency range, the capacitance almost remaining the same.

The object is also achieved by an integrated circuit module with a carrier substrate and at least one integrated circuit on the carrier substrate in that the carrier substrate is multi-layered, at least one such multi-layer capacitor according to the invention is integrated in the carrier substrate and the first and second connecting lines are wired directly or by means of wire or flip-chip connections to the at least one integrated circuit.

In such a complex integrated circuit module with multi-layer carrier substrate, the capacitances can thus be integrated into the deeper layers of the carrier substrate compactly and remote from the surface of the carrier substrate.

It is particularly advantageous if the second connecting lines for the second electrode plates are arranged distributed over the outer circumference of the first electrode plates, the second electrode plates protruding over the outer circumference of the first electrode plates.

Such shielding by means of outer contact hole fences which are formed by the second connecting lines prevents further interfering effects or coupling to adjacent function blocks.

It has been found that in the case of the multi-layer capacitors known from the prior art, in particular, the contact hole connections of the vertical conductor arrangement and between the individual parallel electrode plates contribute to parasitic inductances.

Advantageously, further first connecting lines are arranged symmetrically distributed on a circumference around the central first connecting line. The contacting of the first electrode plates with the signal-conducting first connecting lines is thus not restricted to the central first connecting line.

It is also advantageous if other second connecting lines are arranged distributed on the circumference of the other first connecting lines. Due to the outer fence which is formed on the outer circumference of the second electrode plates by the second connecting lines, the second electrode plates are thus connected in parallel by the further second connecting lines.

In this arrangement, the other first connecting lines should be symmetrically offset with respect to the second connecting lines, for example by 45° in the case of circular electrode plate arrangements with four first and four second connecting lines distributed on the circumference.

The multi-layer capacitor is preferably terminated with first electrode plates at the top and the bottom.

Optionally, more than two rows of connecting lines can also be provided. The decisive factor is that the arrangement of the first and second connecting lines is interconnected ordered or unordered. The shape of the electrode plates is arbitrary: due to the interleaved configuration of the connecting lines or contact holes, the parasitic inductances are reduced and the resonance is shifted towards higher frequencies.

It is particularly advantageous to use circular first and second electrode plates particularly in conjunction with low temperature co-fired ceramics (LTCC).

DESCRIPTION OF THE DRAWINGS

In the text which follows, the invention will be explained illustratively in greater detail with reference to the attached drawings, in which.

DESCRIPTION

Figure 1:
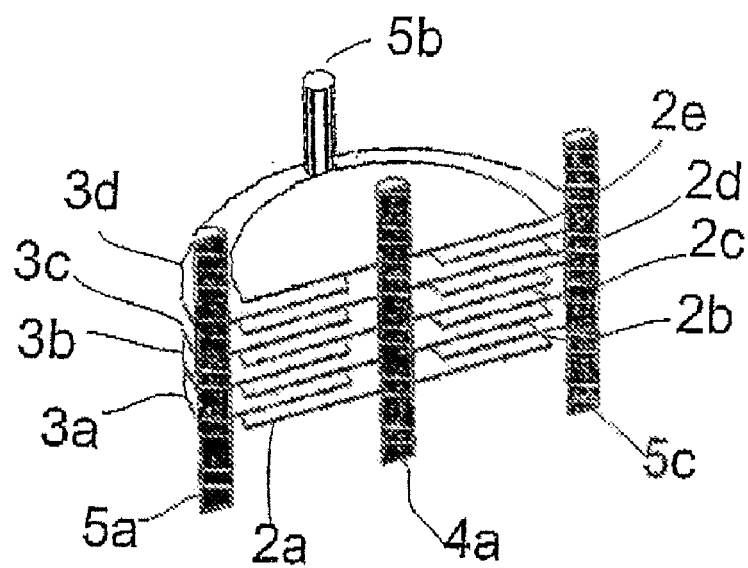
FIG. 1 shows a perspective cross sectional representation of a multi-layer capacitor according to the invention with circular electrode plates.

FIG. 1 shows a perspective cross sectional view of a first embodiment of the multi-layer capacitor 1 according to invention. It is clear that the first circular electrode plates 2a, 2b, 2c, 2d and 2e are stacked above one another alternating with second circular electrode plates 3a, 3b, 3c and 3d. Between the first and second electrode plates 2, 3 lying above one another, there is in each case an insulating layer, not shown.

A first connecting line 4a which is electrically conductively connected to the first electrode plates 2 extends centrally through the multi-layer capacitor 1. The second electrode plates 3 have in the center a hole of such a size that the central connecting line 4a can be conducted through it without short circuit and is insulated from the second electrode plates 3.

The diameter of the second electrode plates 3 is greater than the diameter of the first electrode plates 2 so that four second connecting lines 5a, 5b, 5c, 5d are arranged distributed over the outer circumference of the first electrode plates 2 and are electrically conductively contact-connected to the second electrode plates 3.

The central first connecting line 4a is provided for the signal-conducting line and the second connecting lines 5 are provided for connection to ground.

The diameter of the first and second connecting line 4, 5 can be uniform and can be, for example, 100 μm as is usual. When a greater diameter is selected, the inductance of such a via is reduced with increasing diameter.

However, the use of connecting lines 4, 5 with greater diameter is technologically complex. In addition, the additionally metalized volume would no longer be available as dielectric for the parallel plate arrangement. Instead of, particularly a central first connecting line 4a with greater diameter, it is therefore advantageous to implement a number of vertical connecting lines 4a to 4e in an interleaved configuration with uniform diameter of, for example, 100 μm.

Figure 2:
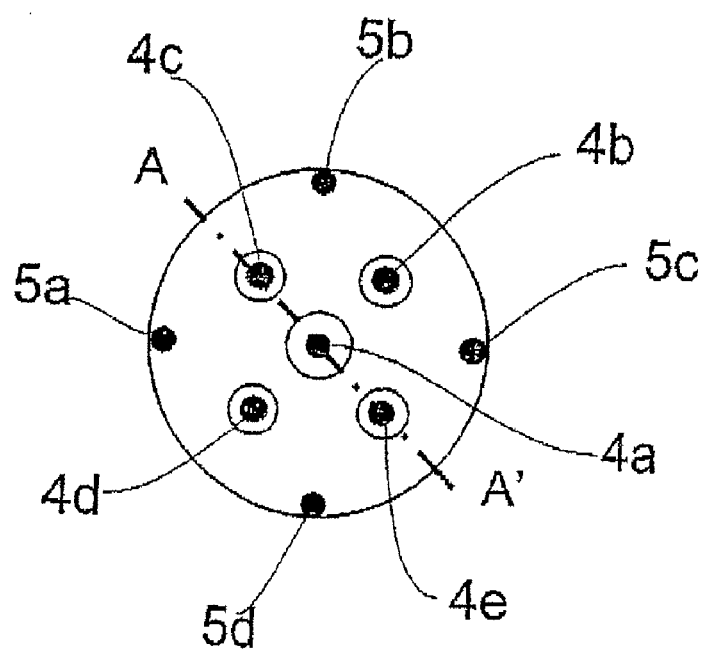
FIG. 2 shows a top view of a second embodiment of a multi-layer capacitor according to the invention.
Figure 4:
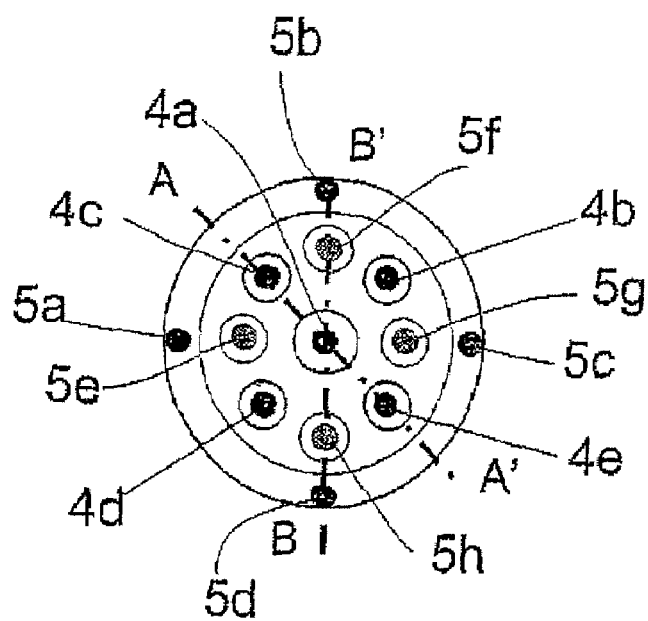
FIG. 4 shows a top view of a third embodiment of a multi-layer capacitor according to the invention.

Such embodiments are shown in a top view in FIGS. 2 and 4.

Other shapes of electrode plates 2, 3 and numbers of connecting lines 4, 5 are conceivable.

FIG. 2 shows a top view of a second embodiment of a multi-layer capacitor 1 according to the invention in which the first electrode plates 2a, 2b, 2c, 2d and 2e are contact-connected to further first connecting lines 4b, 4c, 4d and 4e which are arranged symmetrically distributed around the central first connecting line 4a on a circumference.

It can be seen that the further first connecting lines 4b, 4c, 4d and 4e are symmetrically offset with respect to the second connecting lines 5a, 5b, 5c and 5d. In the case of the four further connecting lines 4b, 4c, 4d and 4e illustrated and four second connecting lines 5a, 5b, 5c, and 5d shown, the offset angle is 45° to the central first connecting line 4a with respect to the axis of the respective first and second lines 4, 5.

Figure 3:
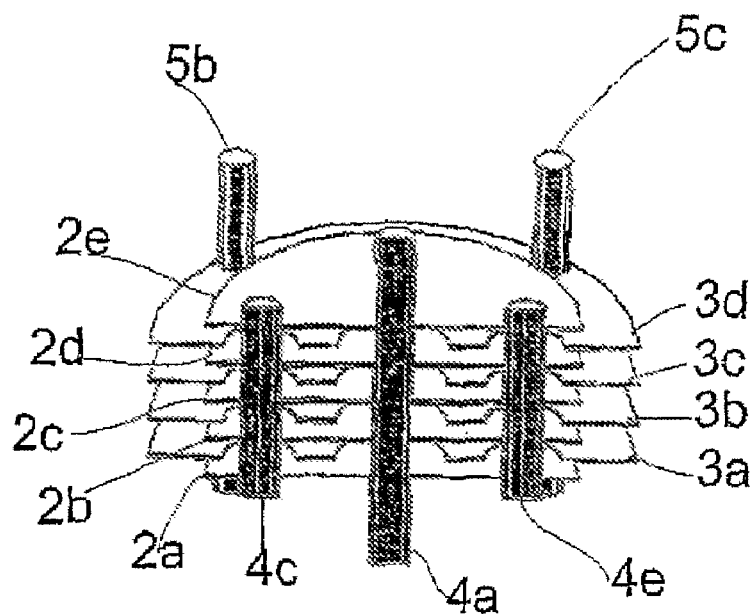
FIG. 3 shows a perspective sectional view of the multi-layer capacitor from FIG. 2 in section AA'.

FIG. 3 shows a perspective sectional view of section AA'. It is clear that the further first connecting lines 4b, 4c, 4d and 4e are electrically conductively connected to the first electrode plates 2 in each case. The second electrode plates 3 have in the area of the further first connecting lines 4b, 4c, 4d and 4e such a large hole that the first connecting lines 4 are insulated from the second electrode plates 3.

In the embodiment, however, only the central first connecting line 4a is brought out for contact-connection to the signal-conducting line and the outer connecting lines 5 are brought out for contact-connection to ground.

Other contacting and wiring arrangements of the connecting lines 4, 5 and of the electrode plates 2, 3 permit outer circuit functions. Thus, for example, the first and second connecting lines 4, 5 could be interconnected with the first and second electrode plates 2, 3 in such a manner that blocking capacitances connected in series with the signal-conducting first connecting line 4a are formed (DC choke).

FIG. 4 shows the top view of a third embodiment of the multi-layer capacitor 1 according to invention. It is clear that, beyond the second embodiment, the second electrode plates 3 are interconnected with other second connecting lines 5e, 5f, 5g, 5h and are connected in parallel.

The other second connecting lines 5e, 5f, 5g and 5h are arranged on the same circumference as the other first connecting lines 4b, 4c, 4d and 4e offset symmetrically by 45° thereto. The other second connecting lines 5e, 5f, 5g and 5h are located in line between the first connecting lines 5a, 5b, 5c and 5d and the central first connecting line 4a.

Figure 5:
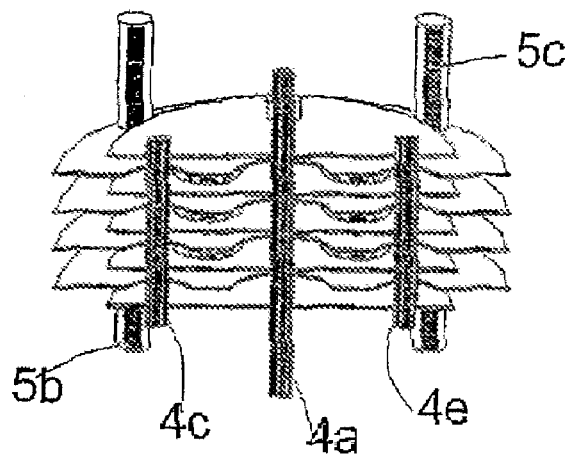
FIG. 5 shows a perspective sectional view of the multi-layer capacitor from FIG. 4 in section AA'.

FIG. 5 shows a perspective sectional view of section AA' of the third embodiment of the multi-layer capacitor 1 according to the invention. It is clear that, as has already been described with reference to FIG. 3, the first electrode plates 2 are connected to the further first connecting lines 4b, 4c, 4d and 4e and are thus connected in parallel.

Figure 6:
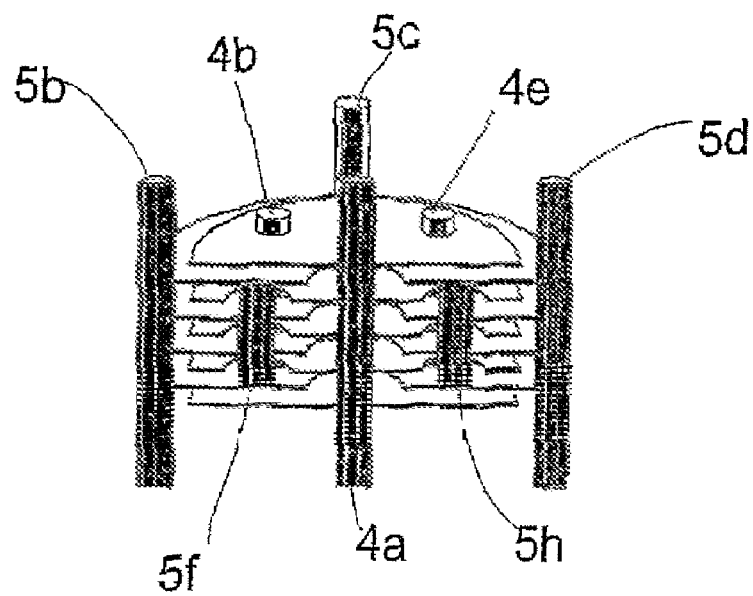
FIG. 6 shows a perspective view of the multi-layer capacitor in section BB'.

FIG. 6 shows a perspective sectional view of section BB'. This shows clearly that the second electrode plates 3 are also interconnected with other connecting lines 5e, 5f, 5g and 5h. In this arrangement, the inner electrode plates, 2b, 2c and 2d have such a hole that they are insulated from the other second connecting lines 5e, 5f, 5g and 5h. The second connecting lines 5e, 5f, 5g and 5h end at the topmost and bottommost second electrode plate 3a, 3b and are not brought through the topmost and bottommost first electrode plate 2a, 2e.

In all embodiments, the space requirement for such a multi-layer capacitor 1 is uniformly determined by the diameter of the electrode plates 2, 3. This is, for example, one millimeter for the second electrode plates 3.

Figure 7:
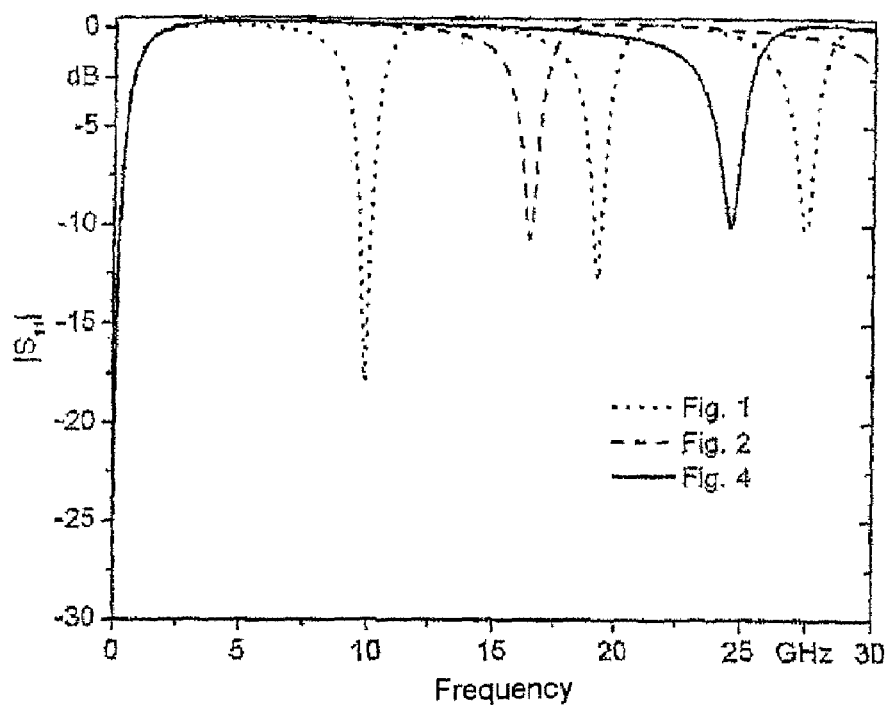
FIG. 7 shows a diagram of the simulated input reflection versus frequency for the first, second and third embodiment of the multi-layer capacitor according to the invention.

FIG. 7 shows a diagram of the simulated input reflection $|S_{11}|$ in dB versus frequency in GHz for the first, second and third embodiment of FIGS. 1, 2 and 4.

It is clear that, due to the additional further first connecting lines of the second exemplary embodiment and particularly due to the addition of further second connecting lines 5 of the third exemplary embodiment, the self-resonances are shifted further and further towards the top into a higher frequency range with increasingly interleaved arrangement.

Thus, the lowest resonant frequency is 10 GHz in the first embodiment according to FIG. 1. In the second embodiment according to FIG. 2, the lowest self-frequency is already shifted towards the top to about 17 GHz. In the third embodiment according to FIG. 4, the lowest resonant frequency is 25 GHz.

Figure 8:
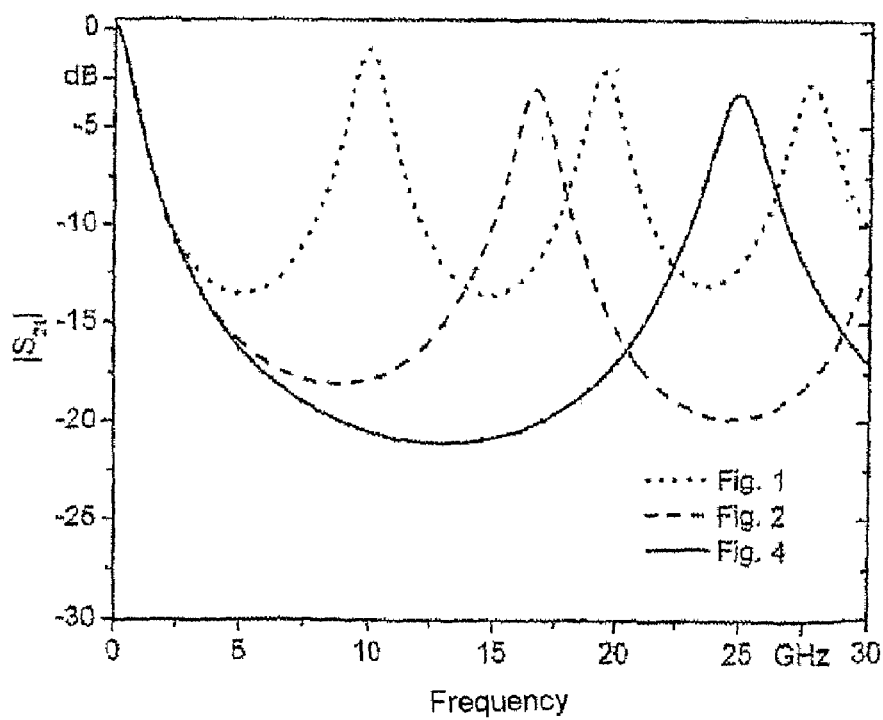
FIG. 8 shows a diagram of the simulated transmission versus frequency of the first, second and third embodiment of the multi-layer capacitor according to the invention.

FIG. 8 shows a diagram of the transmission $|S_{21}|$ in dB versus frequency in GHz for the first embodiment according to FIG. 1, the second embodiment according to FIG. 2 and the third embodiment according to FIG. 4. It is clear that the radio-frequency blocking characteristics of the multi-layer capacitors 1 remain unchanged particularly at low frequencies. This reveals an almost unchanged capacitance of the multi-layer capacitors 1 according to the first, second and third exemplary embodiment. The shift in self-resonances is thus attributable to a reduction in the parasitic inductances.

In the DC choke circuit with blocking capacitances connected in series with the signal-conducting first connecting line 4a, the reflection and transmission characteristics shown in FIGS. 7 and 8 would be essentially exchanged.

According to the principle of the further first and second connecting lines 4, 5 distributed over at least one common circumference for connecting the first and second electrode plates 2, 3 in parallel as shown, the parasitic resonances can be shifted far into the millimeter waveband.

Thus, parasitic effects are reduced by the multi-layer capacitor 1 according to the invention. At the same time, interfering self-resonances can be shifted outside the operating frequency range. In addition, the multi-layer capacitor 1 is compact and provides for an increased degree of integration. In addition, bonds or flip-chip connections can be reduced on the surface of a multi-layer chip module MCM and blocking capacitances can be avoided on the substrate surface. The multi-layer capacitor 1 is characterized by improved shielding and can be flexibly integrated into multi-layer multi-chip modules or as an individual component.

We claim:

1. A multi-layer capacitor comprising:
    a number of electrically insulating layers stacked on top of one another;
    first and second electrode plates arranged in parallel with one another between the insulating layers, wherein the first and second electrode plates are arranged spaced apart from one another above one another alternating with an intermediate insulating layer;
    at least one first connecting line extending perpendicularly through the insulating layers, which is connected to the first electrode plates and is insulated from the second electrode plates;
    second connecting lines extending perpendicularly through the insulating layers, which are connected to the second electrode plates and are insulated from the first electrode plates,
    wherein one of said at least one first connecting line provided for application of a radio-frequency signal extends centrally through the stacked first and second electrode plates, and
    wherein further first connecting lines of said at least one first connecting line are arranged distributed symmetrically around the one first connecting line on a circumference.

2. The multi-layer capacitor as claimed in claim 1, wherein the second connecting lines are arranged distributed over the outer circumference of the first electrode plates and the second electrode plates protrude over the outer circumference of the first electrode plates.

3. The multi-layer capacitor as claimed in claim 1, wherein at least some of said second connecting lines are arranged distributed on the circumference of the further first connecting lines.

4. The multi-layer capacitor as claimed in claim 1, wherein the further first connecting lines (4) are offset with respect to the second connecting lines.

5. The multi-layer capacitor as claimed in claim 1, wherein the multi-layer capacitor is terminated with first electrode plates at the top and the bottom.

6. The multi-layer capacitor as claimed in claim 1, wherein the first and second electrode plates are circular.

7. The multi-layer capacitor as claimed in claim 1, wherein one or more of the further first and the second connecting lines extend through the stacked first and second electrode plates and are electrically conductively connected to associated electrode plates for forming parallel and/or serially connected blocking capacitances.

8. The multi-layer capacitor as claimed in claim 1, wherein the further first and the second connecting lines are electrically interconnected with the first and second electrode plates in such a manner that blocking capacitances connected in series with the at least one first connecting line are formed.

9. An integrated circuit module comprising:
    a carrier substrate; and
    at least one integrated circuit on the carrier substrate,
    wherein the carrier substrate is multi-layered and includes at least one multi-layer capacitor comprising a number of electrically insulating layers stacked on top of one another, first and second electrode plates arranged in parallel with one another between the insulating layers, wherein the first and second electrode plates are arranged spaced apart from one another above one another alternating with an intermediate insulating layer, and with at least one first connecting line extending perpendicularly through the layers, which is connected to the first electrode plates and is insulated from the second electrode plates, and with second connecting lines extending perpendicularly through the layers, which are connected to the second electrode plates and are insulated from the first electrode plates, wherein the at least one first connecting line provided for application of a radio-frequency signal extends centrally through the stacked first and second electrode plates, is integrated in the carrier substrate and the first and second connecting lines are wired directly or by means of wire or flip-chip connections to at least one of the integrated circuits.

* * * * *